United States Patent [19]

Douglas

[11] Patent Number: 4,989,783
[45] Date of Patent: Feb. 5, 1991

[54] SENSOR MOUNTING

[75] Inventor: Barry D. Douglas, Doylestown, Pa.

[73] Assignee: FMC Corporation, Chicago, Ill.

[21] Appl. No.: 393,167

[22] Filed: Aug. 14, 1989

[51] Int. Cl.⁵ .............................................. B05B 15/00
[52] U.S. Cl. ......................................... 239/77; 239/105
[58] Field of Search ................... 239/77, 99, 104, 105, 239/288–288.5; 47/1.7; 172/5, 6

[56] References Cited

U.S. PATENT DOCUMENTS

| | | | |
|---|---|---|---|
| 2,896,854 | 7/1959 | Noble et al. | 239/105 |
| 4,768,713 | 9/1988 | Roper | 239/99 |
| 4,823,268 | 4/1989 | Giles et al. | 239/77 |

FOREIGN PATENT DOCUMENTS 2214047  8/1989  United Kingdom ................. 239/77

Primary Examiner—Andres Kashnikow
Assistant Examiner—Karen B. Merritt
Attorney, Agent, or Firm—Ronald C. Kamp; R. B. Megley

[57] ABSTRACT

An air sprayer having an array of vertically arranged transducers mounted in a recess of a shaped forward shroud, which recess forms a plenum into which air is directed by a fan. Each transducer is carried by a pivotal housing which effectively seals the plenum to force air supplied thereto by the fan to exhaust through channels in a cone to protect the transducer from trash.

4 Claims, 2 Drawing Sheets

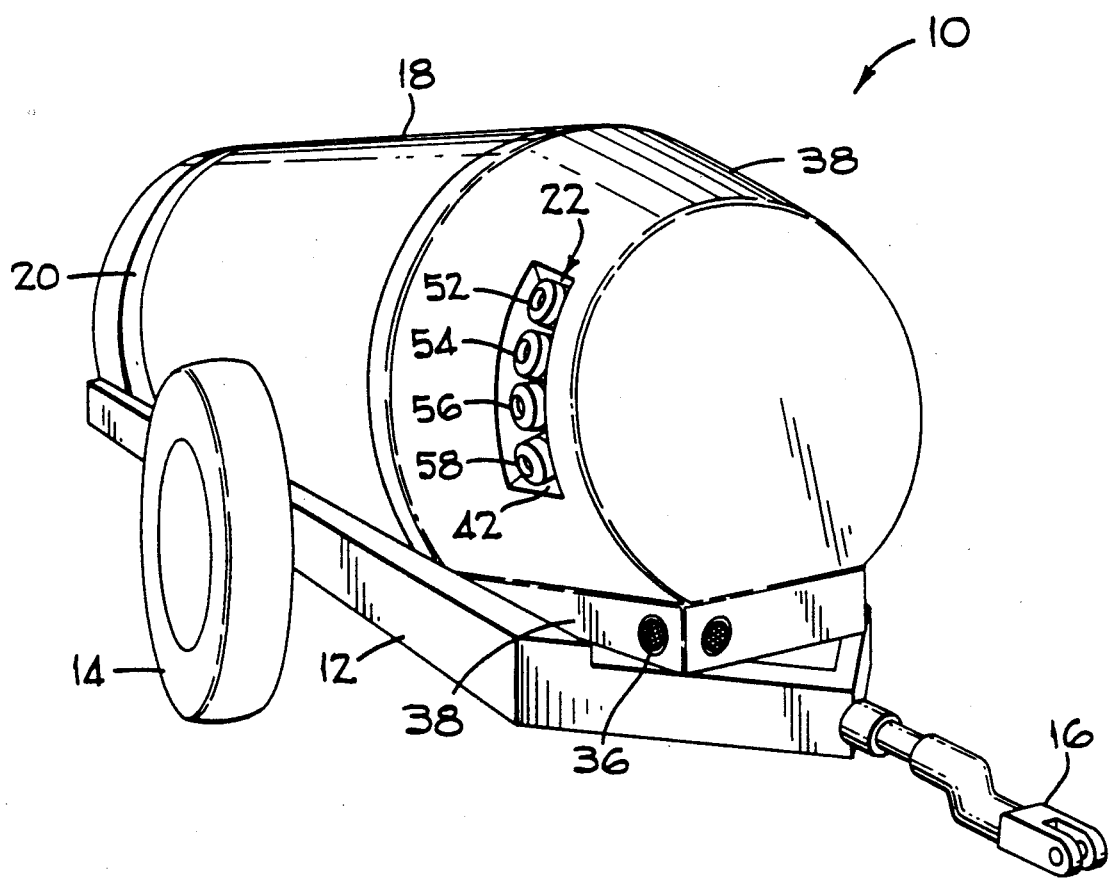
FIG_1

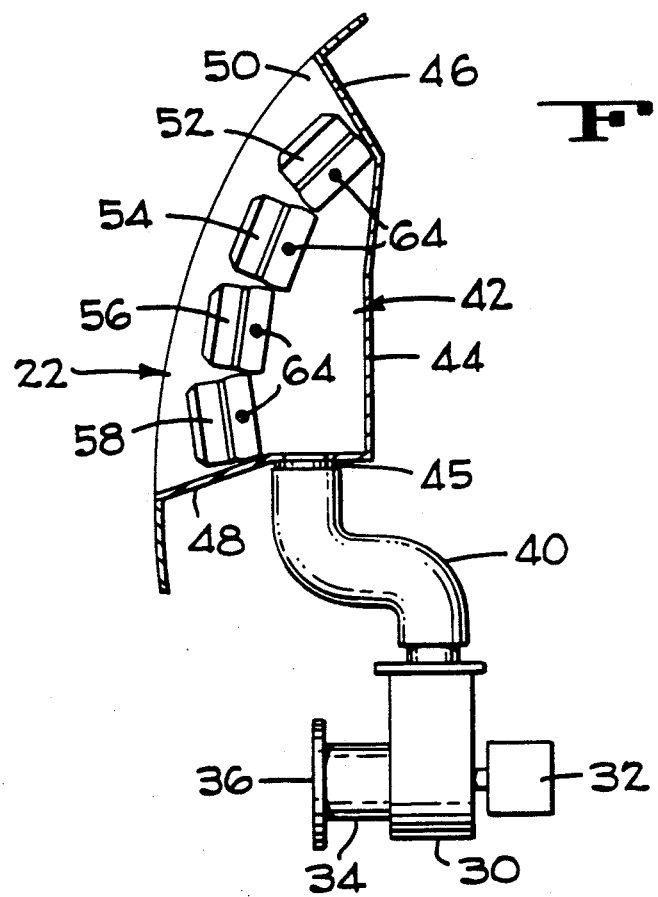
FIG_2
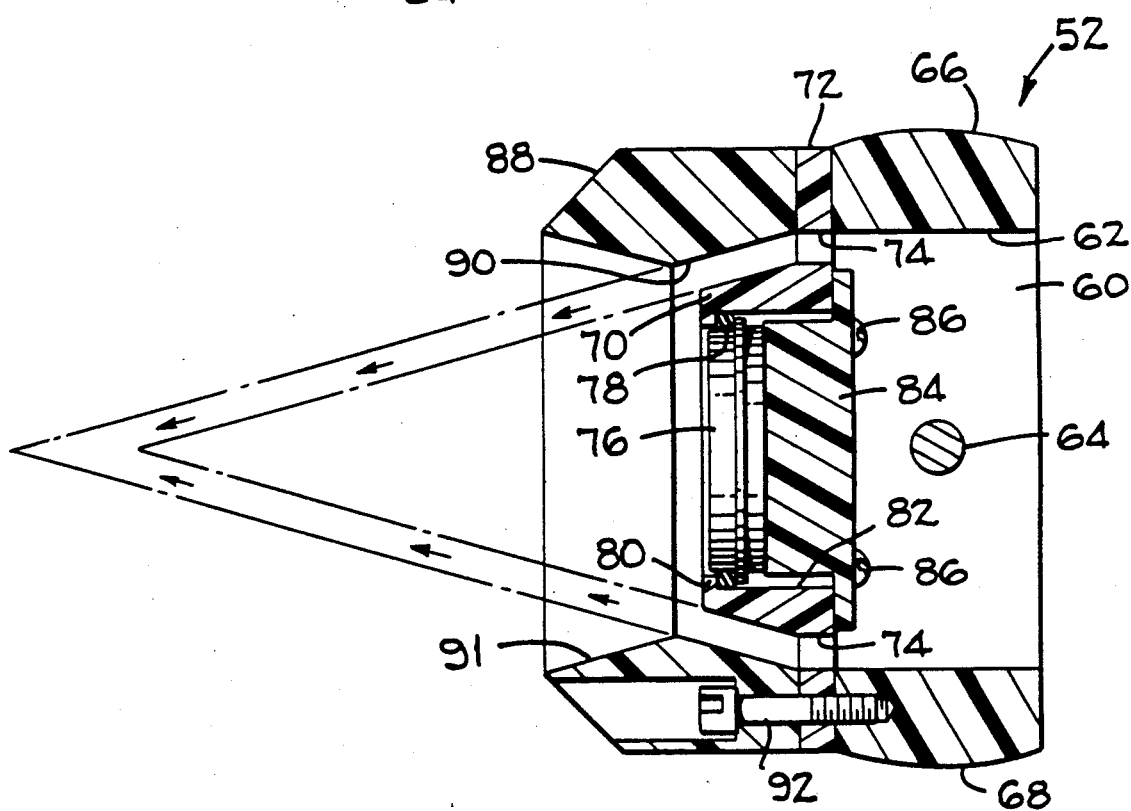
FIG_3

SENSOR MOUNTING

This invention relates to sprayers generally, and more particularly, to the mounting of sensors on such sprayers.

Sensors or transducers are used on sprayers to determine the outline or profile of the trees or shrubs to be sprayed and to turn on valves, when the presence of a tree is detected, to introduce liquid insecticides or fungicides into the air stream from the sprayer's blower. Since the characteristic profile of trees vary, e.g., orange trees branch almost to the ground while almond trees don't, the sensors must be set or angled to areas where foliage for the crop being sprayed would be expected. Thus, the sensors must be easily positioned at selected angles. The sensors must also remain relatively clean to avoid loss of sensitivity. The forceful air stream produced by the sprayer's blower stirs up and entrains dirt in the air surrounding the sprayer as it is towed by a tractor between the rows of crops. Dirt particles are thus present in the air for deposit on the sensors, which is accentuated by the moisture and the sticky characteristics of many insecticides and fungicides.

BRIEF DESCRIPTION OF THE DRAWINGS

The present invention provides a mounting for the sensors which allows their angular orientation to be easily adjusted, which tends to shield the sensors from the dirt particles, moisture and chemicals entrained in the air, which permits the sensors to be easily replaced when required, and which is relatively simple to manufacture and maintains these and other attributes of the present invention, and many of the attendant advantages thereof, will become more readily apparent from a perusal of the following description of a preferred embodiment and the accompanying drawings, wherein:

FIG. 1 is a pictorial view of a sprayer incorporating the present invention;

FIG. 2 is a vertical section through a portion of the sprayer shown in FIG. 1 shown on one of the sensor arrays; and FIG. 3 is a section through one of the sensors shown in the array of FIG. 2.

DETAILED DESCRIPTION OF THE PREFERRED EMBODIMENT

Referring now to FIG. 1, there is shown a sprayer, indicated generally at 10, which has a frame 12 mounted on a pair of wheels, one of which is shown at 14. A tow bar 16 is secured to the frame 12 and is capable of attachment to a tractor for towing of the sprayer between the crop rows. A tank 18 is mounted on the frame 12 and holds the insecticide or fungicide solution. An engine drives a blower, not shown, which discharges air through a grill 20 located near the rear of the sprayer. A pump, also not shown, is driven by the engine and pumps solution from the tank 18 to a bank of valves for discharge of the solution in the tank into the air stream produced by the blower. The valves are controlled by an array of sensors on each side of the sprayer, one array being shown at 22. The valves are opened when the presence of foliage is detected by the array of sensors. For a more complete understanding of the operation of the sensors and their operation of the valves reference may be made to pending U.S. patent application Ser. No. 07/440,401, filed Nov. 16, 1989, which is a continuation of Ser. No. 07/144,992, filed Jan. 19, 1988, now abandoned; and Ser. No. 07/414,622, filed Sept. 29, 1989, which is a continuation of Ser. No. 07/145,173, filed Jan. 19, 1988, now abandoned.

As best seen in FIG. 2, a fan 30, which may be driven by an electric motor 32, draws air through an inlet pipe 34. The open end of the pipe 34 is covered by a screen 36 mounted in an opening in the shroud 38 covering the front of the sprayer. The opening and the screen 36 should be located at a position where concentration of air borne particles is relatively low. Additionally, a filter may be positioned behind or incorporated into the screen 36 to remove particles that would otherwise be drawn by the fan 30 into the pipe 34.

The discharge of the fan 30 is connected by a hose 40 with a recessed plenum 42 formed in the shroud 38. The plenum 42 includes a back wall 44, a upwardly inclined upper wall 46 and a lower wall 48 which is downwardly inclined at its outer end. A rear wall 50 and a front wall, not shown but similar and parallel to the rear wall, join with the shroud 38 and the top and bottom walls 46 and 48 respectively to form the plenum 42. The array 22 of sensor is positioned in the plenum 42 and comprises four individual sensors 52, 54, 56 and 58 which contact each other in series and the top and bottom walls 46 and 48 respectively to effectively block the flow of air from the inner side of the plenum 42 toward the outer side thereof. Since the individual sensors 52–58 are identical, a description of one will be sufficient for an understanding of all.

The upper sensor 52 is shown in FIG. 3 and includes a mounting block 60 which has a central opening 62 and straight forward and rearward surfaces tightly engaging the rear wall 50 and the front wall of the plenum 42. A bolt 64 extends through the front and rear walls and through the middle of the block 60 to hold the sensor 52 in place and to permit it to pivot about the bolt 64. A upper surface 66 of the block 60 is a cylindrical sector having its center on the axis of the bolt 64. The lower surface 68 is also a cylindrical sector similar to surface 66. The upper surface 66 contacts the upper wall 46 and maintains that contact at all angular positions of the sensor 52. Similarly, the lower surface 68 contacts the upper surface of the adjacent sensor 54. The sensors 52, 54, 56 and 58 are thus able to maintain a continuous line of contact between the upper wall 46 and the lower wall 48 to effectively block the flow of air therebetween.

A inner cone member 70 has a outward extending annular flange 72 with a plurality of arcuate openings 74 therein. A transducer 76 is held against an 0-ring 78 seated against a lip 80 formed in a central opening 82 of the cone member 70. A retainer block 84 held by screws 86 secures the transducer 76 in the cone member 70. An outer member 88 having an inner surface 90 complementary to, and spaced from, the cone member 70 is positioned against the flange 72. Screws 92 engaging tapped holes in the block member 60 secure the cone member 70 and the outer member to the block member 60. The openings 74 in the flange 72 provide the exhaust channel for the air flowing into the plenum 42 from the fan 30, the array 22 otherwise effectively blocking exhaust of the air. The cone 70 and the complementary surface 90 of the outer member 88 will cause the air flowing through the openings 74 to form a cone of relatively clean air over the transducer 76 and thereby block contaminants borne by the ambient air from contacting the transducer 76. The transducer 76 will therefore retain its sensitivity and frequent clearing thereof will not be necessary. The outer member 88 extends beyond the transducer 76 and forms a protective hood therefor. The annular surface 91 formed on the member 88 serves to define the field of vision for the transducer 88. That is, the surface 91, being annular and angled outwardly from the transducer, limits or restricts the field of view seen by the transducer 88.

As can be seen in FIG. 2, the upper sensor 52 is much more susceptible to contamination because it is tilted upward a greater amount. By placing the inlet 45 to the plenum 42 in the lower wall 48, the flow of air from the hose 40 will be directed upward toward the top of the plenum 42. A slightly greater flow of air will occur through the channels 74 of the upper sensor 52 than through the other sensors, providing an increased level of protection for the transducer 76 of the upper sensor 52. The greater upward tilt of the upper sensor 52 causes the channels 74 to be more aligned with the air flow when the air is directed from the bottom of the plenum 42 toward the top.

The accuracy of the transducer is adversely affected by a pressure differential across the transducer. This pressure differential can be alleviated by simply allowing a very loose fit between the wire leading to the back of the transducer and the hole, not shown, through which such wire passes.

Replacement of the transducers 76, as may occasionally be necessary, is relatively simple. Removal of the screws 92 will permit removal of the cone member 70. Removal of the screws 86, replacement of the transducer 76 and reassembly is all that is required and can be accomplished on one sensor without affecting any of the other sensors.

While one embodiment of the present invention has been illustrated and described herein, various changes may be made without departing from the spirit of the invention as defined by the scope of the appended claims.

What is claimed is:

1. A means for mounting a transducer in a mobile sprayer having a shroud defining an exterior and an interior comprising:

a recessed plenum formed in said shroud;

a fan for supplying air to said plenum through said interior;

a housing mounted in said plenum and supporting said transducer; and said housing having channels for directing the air supplied to said plenum by said fan forward of said transducer.

2. The invention according to claim 1, and further comprising:

rod means extending through said housing to permit angular adjustment of said transducer.

3. A means for mounting a plurality of transducers in a substantially vertical array in a mobile sprayer having a shroud defining an interior and an exterior comprising:

a plenum formed in said shroud and recessed toward said interior to define front and rear walls;

a fan for supplying air to said plenum through said interior;

a plurality of housings, one for supporting each of said plurality of transducers, pivotally mounted within said plenum;

each housing extending between said walls and having a cylindrical section for engagement with the adjacent one in said array to substantially block the air supplied to said plenum by said fan; and said housing having channels for directing air from said plenum to form a cone of air around and forward of said transducer.

4. In a mobile air sprayer for dispensing chemicals in groves and vineyards, said sprayer having a forward shroud to deflect branches and vines, the improvement comprising:

a recessed plenum formed in said shroud to form front, rear, top and bottom walls;

a fan mounted under said shroud;

a single supply hose connecting the fan output to said plenum;

an inlet pipe connected to the intake of said fan and extending through the shroud at a forward portion thereof;

a plurality of housings pivotally mounted in said plenum and arranged in a substantially vertical array;

said housing having opposite vertical surfaces engaging said front and rear walls and cylindrically shaped top and bottom surfaces for engagement with adjacent housings and with said top and bottom walls to substantially seal said plenum while permitting said housings to individually pivot;

a transducer mounted in each housing; and channels formed in each of said housings for directing air from said plenum to form a core of air around and forward of each transducer.

* * * * *